United States Patent [19]

Asao et al.

[11] Patent Number: 5,791,431
[45] Date of Patent: Aug. 11, 1998

[54] ALL TERRAIN VEHICLE FRAME STRUCTURE

[75] Inventors: Kosuke Asao; Hitoshi Furuhashi; Masahiro Kawamata; Yukio Kamo, all of Saitama, Japan

[73] Assignee: Honda Giken Kogyo Kabushiki Kaisha, Tokyo, Japan

[21] Appl. No.: 712,963

[22] Filed: Sep. 12, 1996

[51] Int. Cl.$^6$ .............................. B62K 11/02; B62J 35/00
[52] U.S. Cl. .......................... 180/311; 280/835; 280/798
[58] Field of Search ................................. 180/291, 69.4, 180/311, 312, 908; 280/835, 834, 781, 796, 798

[56] References Cited

U.S. PATENT DOCUMENTS

| | | | |
|---|---|---|---|
| 1,347,337 | 7/1920 | Kline | 180/312 |
| 2,919,139 | 12/1959 | Rupp, II | 280/798 |
| 4,600,074 | 7/1986 | Watanabe et al. | 180/251 |
| 4,687,069 | 8/1987 | Inomata et al. | 180/68.2 |
| 4,735,275 | 4/1988 | Tsukahara et al. | 180/215 |
| 4,836,324 | 6/1989 | Morita et al. | 180/291 |
| 4,892,165 | 1/1990 | Yasui et al. | 280/798 |
| 4,930,811 | 6/1990 | Tsukada et al. | 180/69.4 |

FOREIGN PATENT DOCUMENTS

| | | | |
|---|---|---|---|
| 63-101187 | 5/1988 | Japan . | |
| 1-254480 | 10/1989 | Japan | 180/311 |
| 2-128974 | 5/1990 | Japan | 280/835 |
| 3-136987 | 6/1991 | Japan | 180/311 |
| 3-193582 | 8/1991 | Japan | 180/311 |
| 2238514 | 6/1991 | United Kingdom | 180/311 |

*Primary Examiner*—Peter C. English
*Attorney, Agent, or Firm*—Birch, Stewart, Kolasch & Birch, LLP

[57] ABSTRACT

A frame structure for a saddle-seat vehicle supports a plurality of wheels, with at least one of the wheels being steerable, and with at least one of the wheels being driven by a power unit. The frame structure includes a main frame member. The main frame member has a generally cylindrical cross-section and is formed as a one-piece continuous tubular member. The main frame member includes a left portion, a right portion, and a curved front portion interconnecting the left portion with the right portion. The curved front portion is located above and forwardly of the power unit. A heat plate is located between the left portion and the right portion, and rearwardly of the curved front portion. The heat plate includes a plurality of lip portions which overlay the left portion, the right portion, and the curved front portion of the main frame member. The lip portion includes a pair of elastic bushings which are located between the lip portion and the left and right portions of the main frame member. A plate bracket fastens the heat plate to the main frame member. A fuel tank is located above the heat plate and the plate bracket and is spaced therefrom by the pair of elastic bushings and by a third elastic bushing provided on the heat plate. This spacing provides an air gap between the heat plate and fuel tank for cooling the heat plate. A steering column bracket is attached to the curved front portion of the main frame member.

20 Claims, 7 Drawing Sheets

ALL TERRAIN VEHICLE FRAME STRUCTURE

BACKGROUND OF THE INVENTION

1. Field of the Invention

The present invention relates to a frame structure for a saddle-seat vehicle, such as an all-terrain vehicle (ATV), and more particularly, to a frame structure having a one-piece continuous main frame member.

2. Description of the Background Art

Figure 11:
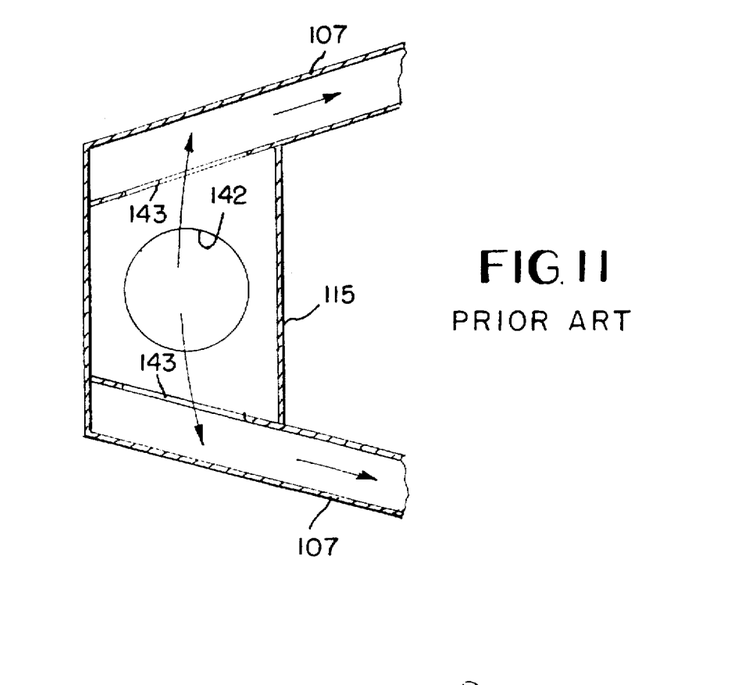
FIG. 11 is a top plan view of prior art right and left main pipes.
Figure 12:
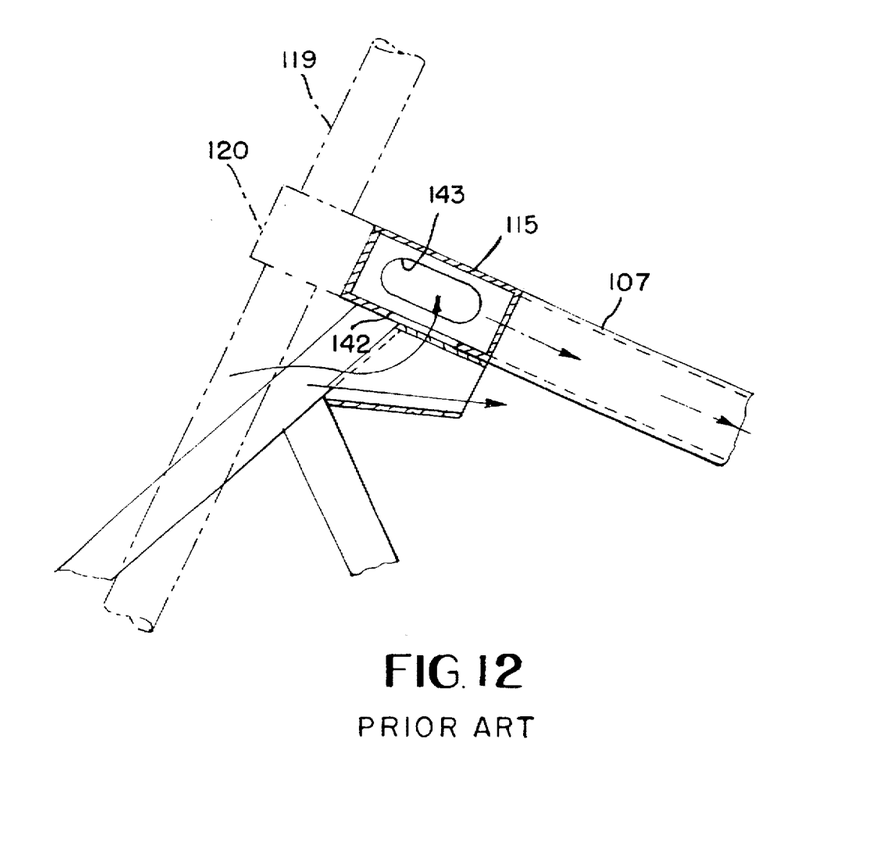
FIG. 12 is a side view of a portion of a prior art frame structure.

Various frame structures for saddle-seat vehicles are known in the art. For example, Japanese laid-open document 63-101187 discloses a frame structure for a four wheeled vehicle. FIGS. 11 and 12 show figures from this Japanese document in which a vehicle's right and left main pipes 107 have a rectangular cross section. As shown in FIG. 11, a front gusset 115 is welded to the front end portions of the right and left main pipes, thereby interconnecting the right main pipe with the left main pipe. An upper steering bracket 120 in FIG. 12 is attached to a front portion of the gusset 115 for supporting a steering column 119 of the vehicle. An air intake hole 142 is provided in the gusset 115, and a pair of air intake holes 143 are provided in the front portions of the right and left side pipes 107. Combustion air for the engine of the vehicle is supplied to the air cleaner case of the vehicle by introduction through the air intake hole 142 the gusset 115, and subsequently passing through the air intake holes 143 and through the interiors of the right and left main pipes 107.

While this arrangement is useful for providing combustion air to the engine of the vehicle, it requires the assembly of separate components through a welding process. This involves considerable extra time spent fabricating the individual components, and subsequently welding them together. In order to obtain sufficient rigidity for supporting the upper steering bracket during hard breaking of the four wheeled vehicle, the multipiece welded frame of the prior art required a long welding distance, which increases manufacturing costs, and a thicker bracket and frame, increasing both cost and weight.

SUMMARY OF THE INVENTION

Accordingly, it is an object of the present invention to provide a frame structure for a saddle-seat vehicle which includes a main frame member which is simple to manufacture.

It is a further object of the present invention to provide a frame structure for a saddle-seat vehicle which is sufficiently rigid so as to effectively support a steering bracket for the steering column.

Yet another object of the present invention is to provide a frame structure for a saddle-seat vehicle which is lightweight.

These and other objects of the present invention are fulfilled by a frame structure for a vehicle which includes a main frame member formed as a one-piece continuous tubular member having a generally cylindrical cross-section. The main frame member includes a left side portion, a right side portion, and a front curved portion interconnecting the left and right side portions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention, and wherein.

DETAILED DESCRIPTION OF THE PREFERRED EMBODIMENT

Figure 1:
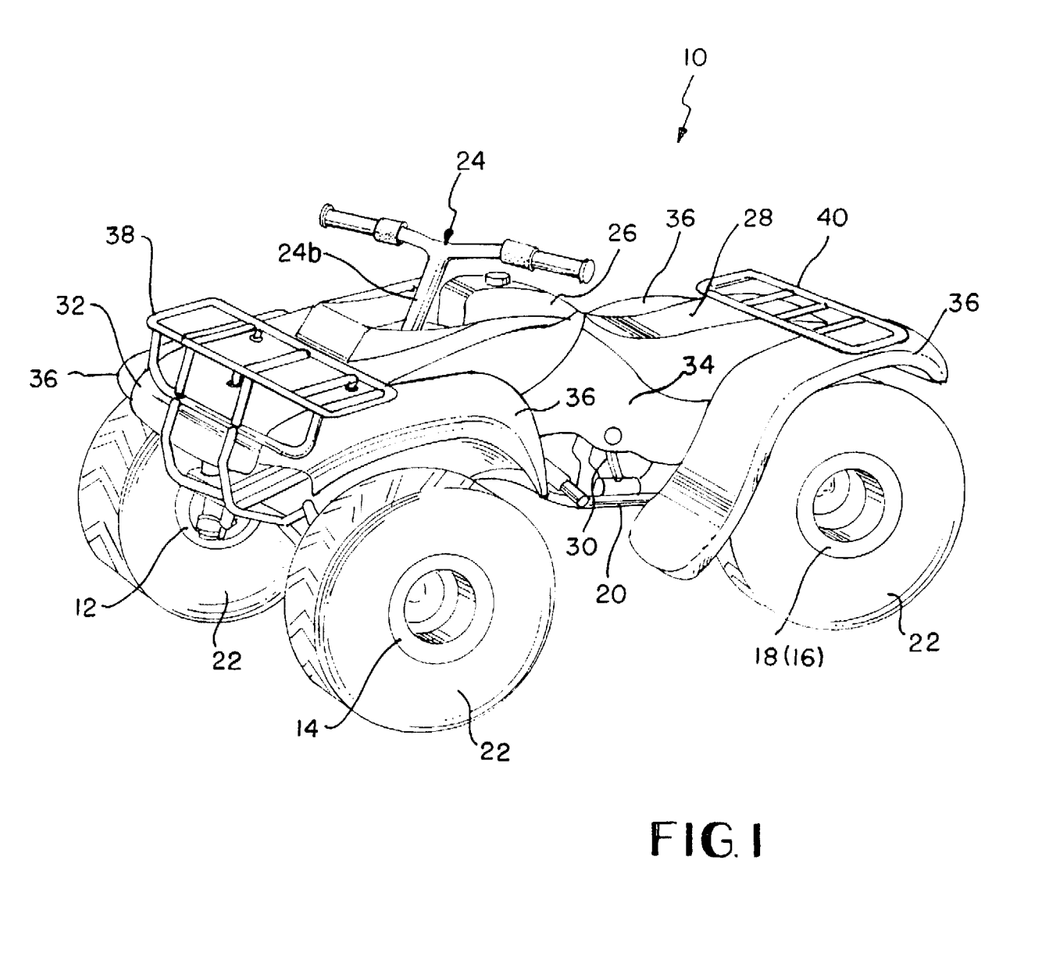
FIG. 1 is a perspective view of the saddle-seat vehicle of the present invention.

Referring in detail to the drawings and with particular reference to FIG. 1, a saddle-seat vehicle 10 such as an all terrain vehicle, ATV, is shown. This saddle-seat vehicle 10 includes a pair of right and left front wheels 12, 14 and a pair of right and left rear wheels 16, 18 which are respectively suspended from front and rear portions of a vehicle frame 20. A balloon-type low pressure tire 22 is mounted around each of the front wheels 12, 14 and the rear wheels 16, 18. On the upper portion of the vehicle frame 20, a steering handle 24, a fuel tank 26, and a saddle-seat 28 are disposed. A power unit 30 for driving the rear wheels 16, 18 is disposed within the vehicle frame 20. This power unit 30 could be an electric motor, a gasoline powered motor or any known drive.

A front body cover 32 and a rear body cover 34 are arranged over upper portions of the vehicle frame 20. The front body cover 32 and rear body cover 34 each include fenders 36 for covering upper portions of the front and rear tires 22. Front and rear cargo carriers 38, 40 are arranged over the front and rear body covers 32, 34 for allowing cargo to be secured thereto. It should be appreciated that the foregoing features of the vehicle, such as the positioning and type of body cover, the use of cargo carriers, etc. could readily be varied. This description of the vehicle is merely given to provide an environment in which the vehicle frame can be used and is not intended to limit the instant invention. Moreover, it should be recognized that the instant invention can not only be applied in all terrain vehicles, but could also be utilized in other vehicles, such as motorcycles, snowmobiles, three wheeled vehicles, etc.

Figure 2:
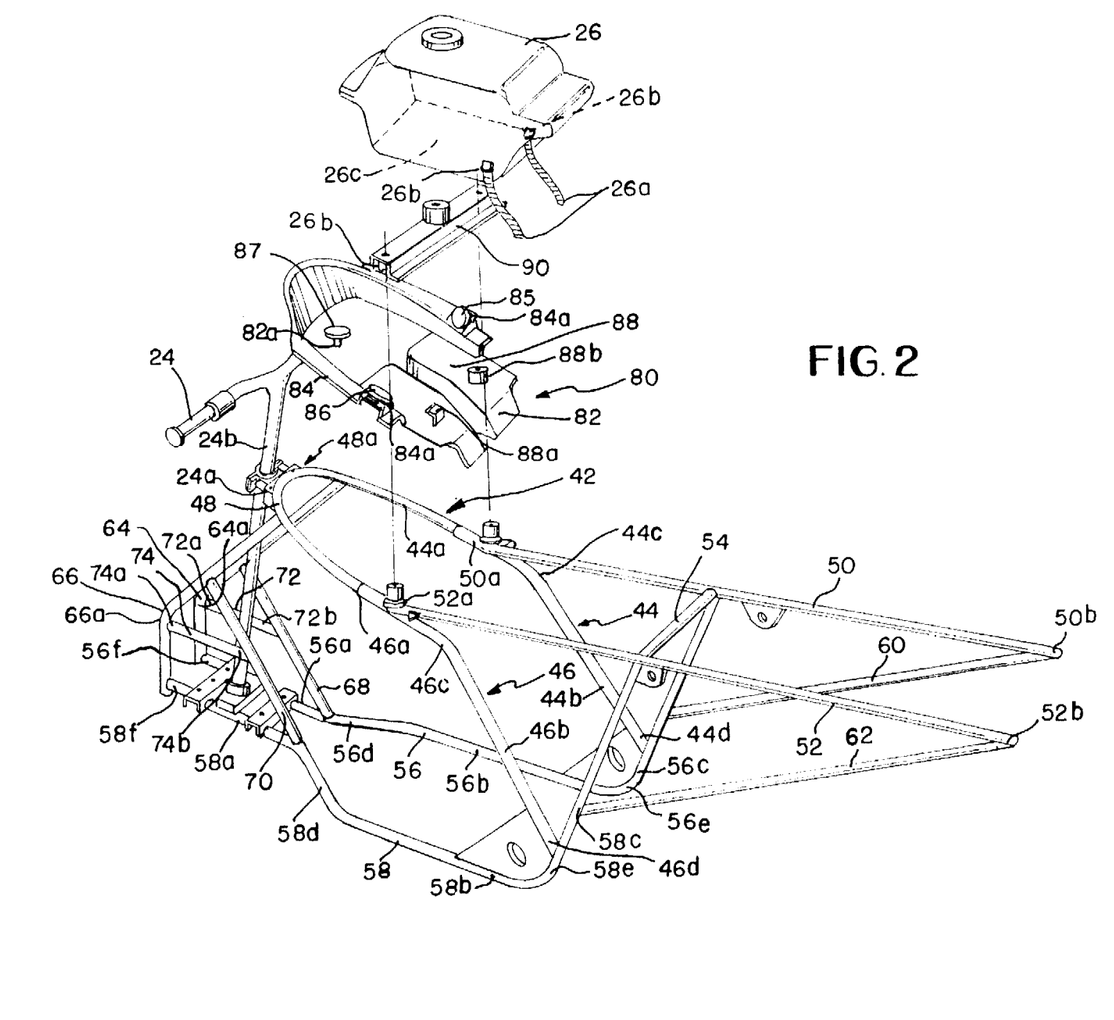
FIG. 2 is an exploded perspective view of the frame structure of the present invention.
Figure 3:
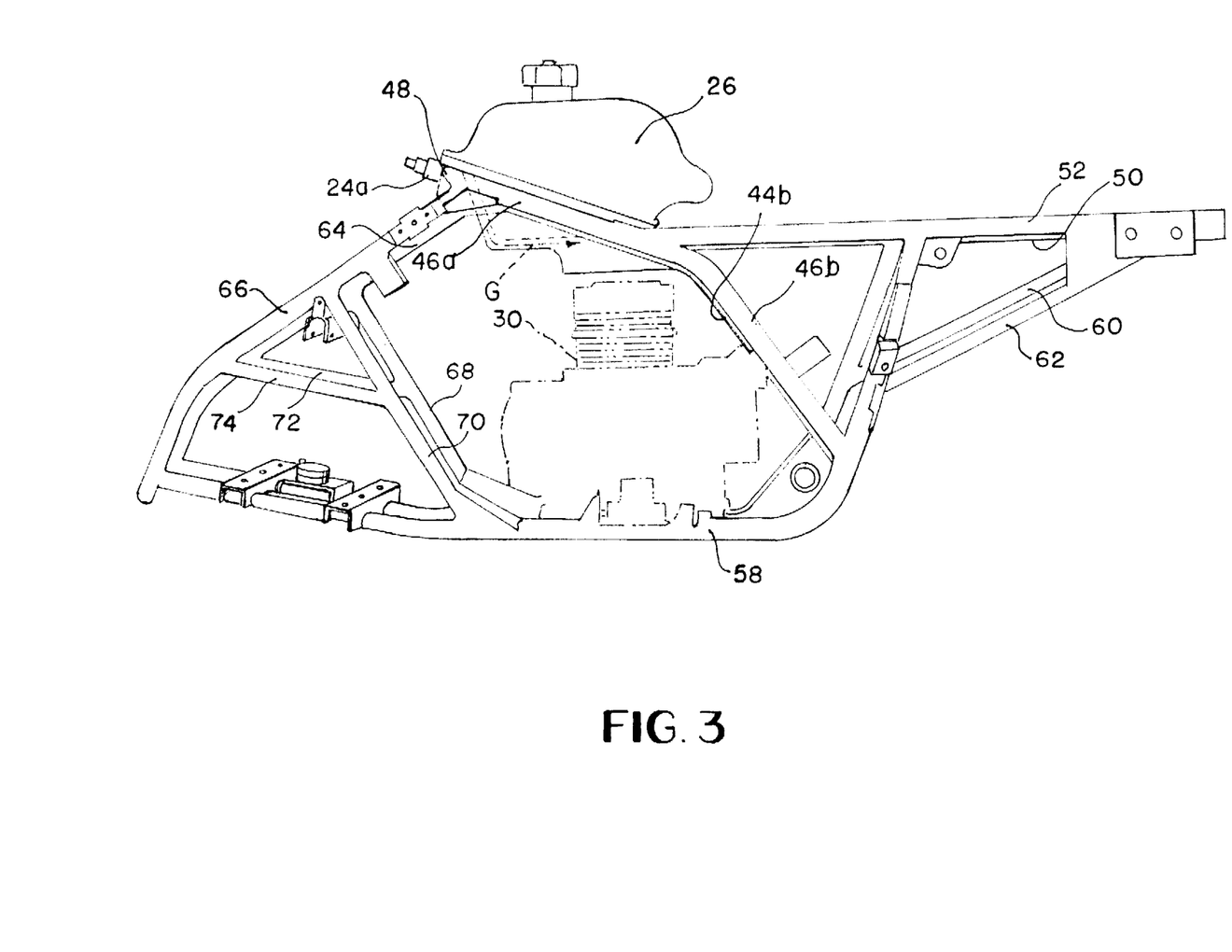
FIG. 3 is a side view of the frame structure shown in FIG. 2.
Figure 4:
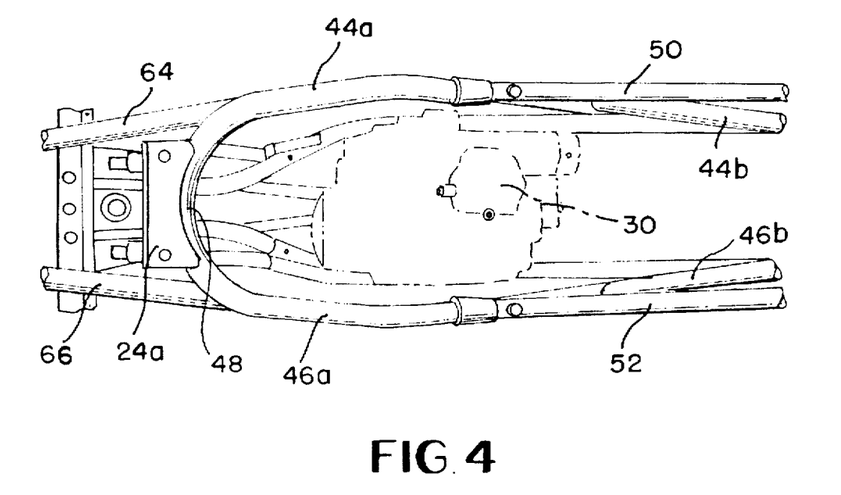
FIG. 4 is a top view of the frame structure shown in FIG. 2.

The structure of the vehicle frame 20 will now be described with reference to FIG. 2. The vehicle frame 20 includes a main pipe 42 having a right portion 44 and a left portion 46 arranged in spaced-apart, substantially mirror-image fashion. A curved front portion 48 of the main pipe 42 interconnects the right portion 44 and the left portion 46. The main pipe 42 is formed as a unitary, one-piece continuous tubular member having a circular cross-section. The main pipe 42 is bent to form the right, left and front portions 44, 46, 48 of the main pipe 42. Bending of the main pipe 42 during manufacture is easily performed due to the circular cross-section of the main pipe 42.

Each of the right and left portions 44, 46 includes an upper portion 44a, 46a and a lower portion 44b, 46b, with a bend 44c, 46c located therebetween approximately midway along the respective right and left portions 44, 46. The upper portions 44a, 46a of the respective right and left portions 44, 46 extend downwardly and outwardly from the curved front portion 48 of the main pipe 42 to the bends 44c, 46c. The lower portions 44b, 46b of the respective right and left portions 44, 46 extend downwardly from the bends 44c, 46c to an end 44d, 46d of the respective right and left portions 44, 46.

A pair of right and left side pipes 50, 52 extend substantially rectilinearly rearwardly from the main pipe 42. A forward end 50a, 52a of each of the right and left side pipes 50, 52 is fastened to the respective right and left portions 44, 46 of the main pipe 42, preferably by welding at a location along the upper portions 44a, 46a near the bends 44c, 46c.

A rear cross pipe 54 is connected between the right side pipe 50 and the left side pipe 52, preferably by welding.

A pair of right and left lower pipes 56, 58 are attached to respective ends 44d, 46d of the main pipe 42, and to the respective side pipes 50, 52, preferably by welding. Each of the lower pipes 56, 58 includes a front portion 56a, 58a, a bottom portion 56b, 58b and a rear portion 56c, 58c. The bottom portions 56b, 58b are spaced-apart and substantially parallel with one another. Similarly, the front portions 56a, 58a are substantially parallel with one another, but are spaced apart by a distance less than that of the bottom portions 56b, 58b. An angled portion 56d, 58d is located between each front portion 56a, 58a and bottom portion 56b, 58b which allows for the change of spacing between the front portions 56a, 58a and bottom portions 56b, 58b of the lower pipes 56, 58. A bend 56e, 58e is located between the bottom portion 56b, 58b and the rear portion 56c, 58c which allows the rear portion 56c, 58c to extend upwardly and rearwardly from the bottom portion 56b, 58b.

A pair of right and left support pipes 60, 62 are connected between the respective rear portions 56c, 58c of the right and left lower pipes 56, 58 and rear ends 50b, 52b of the right and left side pipes 50, 52.

A pair of right and left front pipes 64, 66 are connected between front ends 56f, 58f of the respective front portions 56a, 58a of the lower pipes 56, 58 and the curved front portion 48 of the main pipe 42. Each of the right and left front pipes 64, 66 includes a bend 64a, 66a therein.

A pair of right and left mid-pipes 68, 70 extend between the respective right and left front pipes 64, 66 and the lower pipes 56, 58. A pair of right and left reinforcing pipes 72, 74 are attached at a first end 72a, 74a to the respective right and left front pipes 64, 66 near the bends 64a, 66a therein, and at a second end 72b, 74b to the respective right and left mid pipes 68, 70.

Figure 5:
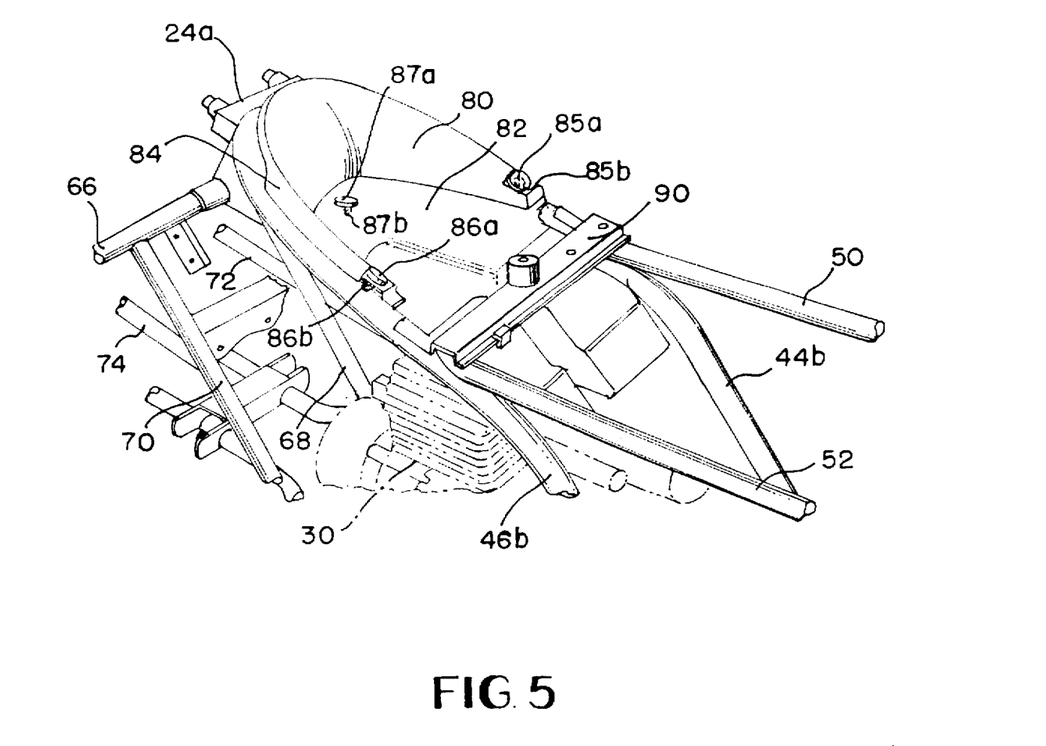
FIG. 5 is a view showing the heat plate of the present invention attached to the frame structure.
Figure 6:
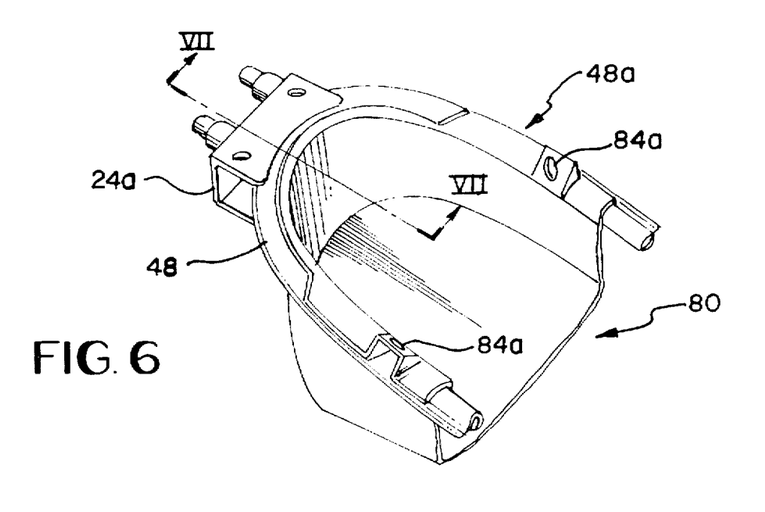
FIG. 6 is an enlarged view showing a portion of the heat plate.

A heat plate 80 is supported on the main pipe 42 and includes a central region 82 which is located interiorly of the partial loop 48a formed by the curved front portion 48 and the upper portions 44a, 46a of the main pipe 42. The heat plate 80 includes a lip portion 84, comprising left and right lip portions, which is supported by upper surfaces of the curved front portion 48 and the upper portions 44a, 46a of the main pipe 42. Right and left resilient bushings 85, 86 are arranged in corresponding apertures 84a in the lip portion 84 of the heat plate 80. The bushings 85, 86 are located between the lip portion 84 and the left and right portions of the main frame member, and spaced from and out of engagement with the main frame member. A central resilient bushing 87 is arranged in an aperture 82a in the central region 82 for reasons which will be described hereinbelow. Each of the bushings 85, 86, 87 includes a head 85a, 86a, 87a which is arranged on an upper surface 88 of the heat plate 80, and a stub 85b, 86b, 87b which extends through the respective apertures 82a, 84a and below the heat plate 80.

Figure 8:
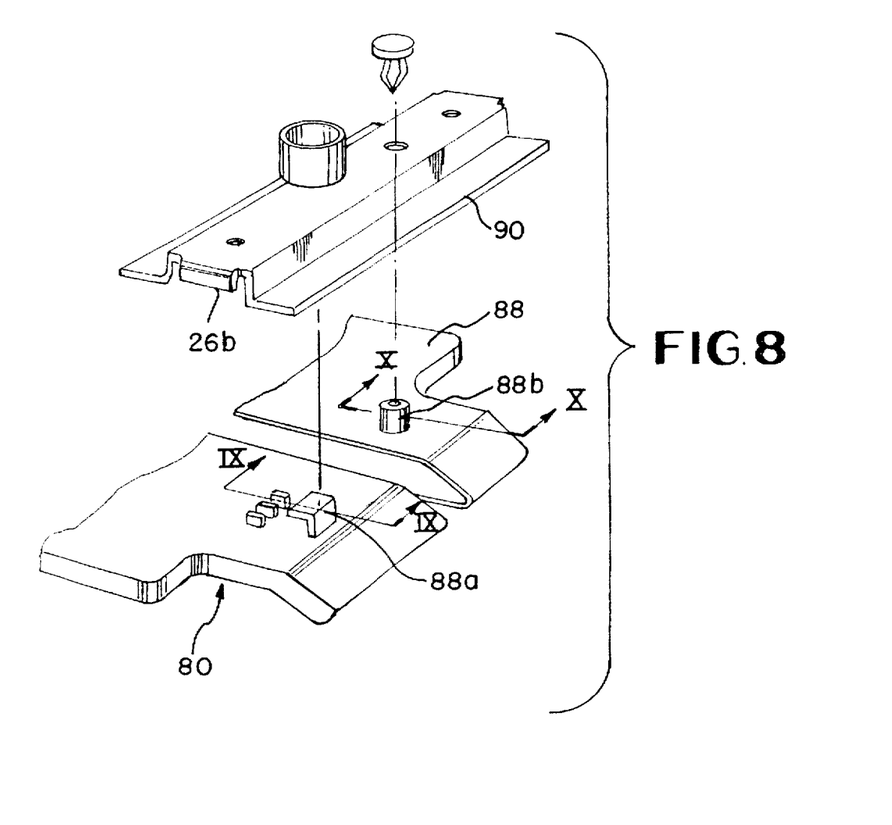
FIG. 8 is an exploded perspective view of the heat plate and the plate bracket.
Figure 9:
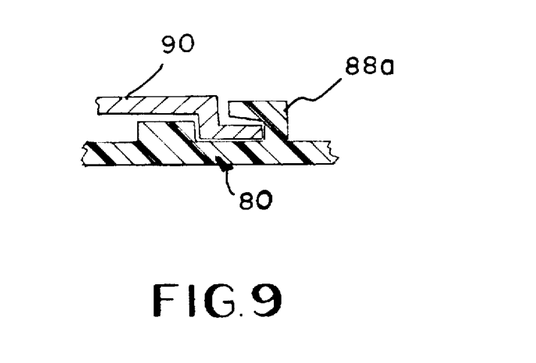
FIG. 9 is a section view along the line IX—IX in FIG. 8, with the plate bracket shown in the assembled position.
Figure 10:
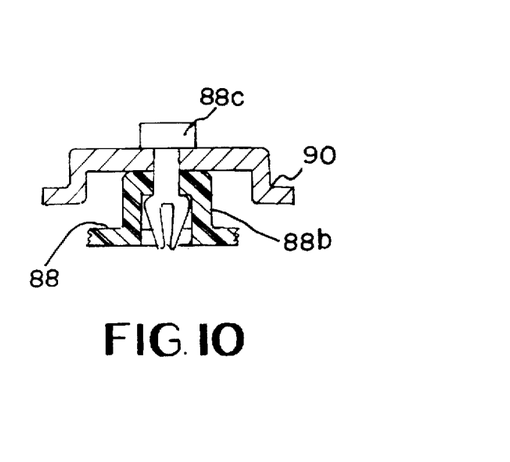
FIG. 10 is a section view along the line X—X in FIG. 8, with the plate bracket shown in the assembled position.

A plate bracket 90 overlies the upper surface 88 of the heat plate 80 and assists in retaining the heat plate 80 in place on the main pipe 42. The upper surface 88 of the heat plate 80 includes a slots forming member 88a which forms a slot that receives the plate bracket 90 therein. The upper surface 88 further includes a projection 88b which receives a connection 88c therein to attach the plate bracket 90 to the heat plate 80. The plate bracket 90 is fastened to the right and left side pipes 50, 52 with suitable fasteners near the forward ends 50a, 52a thereof.

Figure 7:
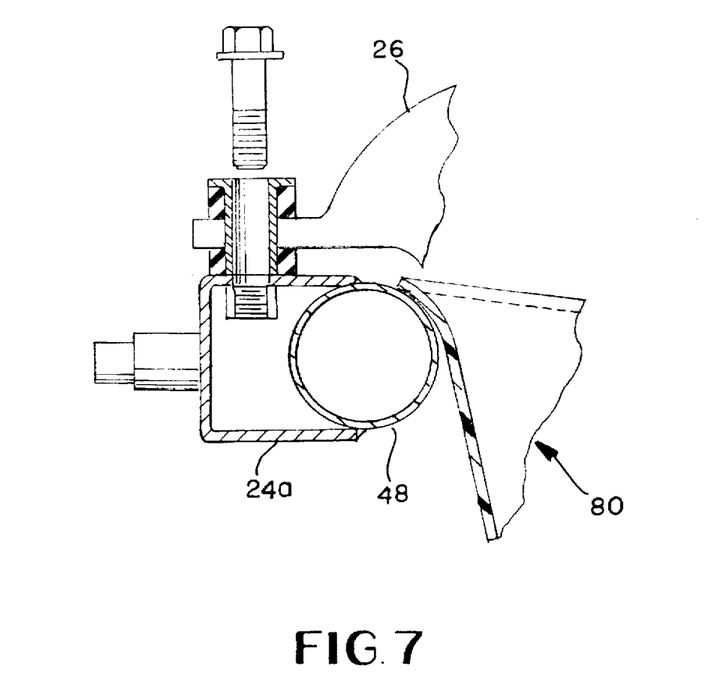
FIG. 7 is a section view in the direction VII—VII in FIG. 6, and including the fuel tank and the associated mounting arrangement.

The fuel tank 26 is arranged to be supported above the heat plate 80. The fuel tank 26 is preferably made of plastic, however, other suitable materials may be used such as steel and aluminum. The fuel tank 26 is fastened to the vehicle frame 20 by a pair of releasable elastic members 26a which extend between suitable hooks 26b on the fuel tank 26 and the plate bracket 90. A lower wall 26c of the fuel tank 26 is supported by the heads 85a, 86a, 87a of each of the right, left and central bushings 85, 86, 87. This results in the formation of an air gap G between the lower wall 26c of the fuel tank 26 and the upper surface 88 of the heat plate 80. This allows cooling air to pass through the air gap G for dissipating heat from the heat plate 80 and away from the fuel tank 26. Thus, the heat plate 80 is sandwiched between the fuel tank 26 and the main pipe 42.

A lower portion of the fuel tank 26 is received in an interior area of the partial loop 48a formed by the curved front portion 48 of the main pipe 42. Placing the fuel tank 26 in this interior area produces a lower center of gravity, resulting in increased stability of the vehicle 10. Further, at least a portion of the fuel tank 26 is protected since it is located within the vehicle frame 20.

An upper steering bracket 24a is attached to the curved front portion 48 of the main pipe 42 for supporting an upper portion of a steering column 24b of the vehicle 10. Further, the fuel tank 26 may be fastened to the upper steering bracket 24a using bolts or other suitable fasteners.

The present invention provides several advantages over the prior art. For example, due to the partial loop 48a formed by the single main pipe 42, the rigidity of the front end of the main pipe 42 is increased, because there are no welded joints interconnecting separate pipes together, as in the prior art. Further, the present invention is more easily manufactured because no welding is required to produce the main pipe 42. Still further, the bending process required to produce the main pipe 42 is easily performed due to the round cross-section of the main pipe 42. Also, round pipe is superior to rectangular cross-section tubing since rectangular tubing has a tendency to bulge at the inner radius of a bend. Thus, round pipe can be bent to have a smooth contour. This allows the heat plate 80 to be placed thereon in a stable manner. Finally, the partial loop 48a of the main pipe 42 allows increased room in an area interior of the front partial loop 48a, thus enabling placement of the fuel tank 26 in this area. The fuel tank 26 can have an increased capacity compared to prior art tanks, and has the center of gravity shifted downwardly and forwardly, resulting in favorable driving performance of the vehicle 10.

Although the present invention has been described with reference to the specific embodiment, it will be understood that the present invention is not limited thereto, and the same may be varied in many ways. For example, the power unit 30 for driving the rear wheels 16, 18 is preferably a gasoline powered engine, but may include other types of internal combustion engines, or may be an electric motor. Further, although rear wheel drive is shown herein, the present invention can be adapted for front wheel drive or all wheel drive if desired.

The vehicle frame 20 is preferably made of steel, but may also be formed from other materials suitable for frames, such as aluminum, fiberglass, or composites. Similarly, although the main pipe 42 and the other pipes 50–74 described herein are preferably formed from a hollow circular tube, the pipe can also be oval, rectangular, hollow or solid.

Although the right and left portions 44, 46 of the main pipe 42 are shown as being substantially identical, they may be dissimilar, if necessary. In other words, instead of being a mirror image, one pipe portion could be bent and the other could be straight or any other configuration for the main pipe could be had. Further, although the right and left portions 44, 46 include a bend 44c, 46c therein, this bend 44c, 46c is not essential to the structural rigidity of the vehicle frame 20, and may be eliminated if desired.

Although the illustrated embodiment includes a bent main pipe 42 with right and left side pipes 50, 52 attached thereto and extending rearwardly therefrom, it will be understood that the right and left side pipes 50, 52 can be configured as a continuous one-piece member which includes the curved front portion 48, with a pair of right and left angled members substituting for the lower portions 44b, 46b of the main pipe 42. Alternatively, the upper portions 44a, 46a of the left and right portions 44, 46 could be made from different pipes welded to the front portion 48. The connection of the front portion 48 to the left and right portions 44, 46 could also be a welded connection or an interlocking pipe connection wherein a portion of one of the pipes slides into another pipe to form the connection. However, with such a welded connection or interlocking pipe connection, the strength of the vehicle frame may be reduced and the number of manufacturing steps increased so that the benefits of a single unitary one-piece pipe are not realized. Any of the previously discussed connections such as by welding could be such a sliding interlock connection or any other known type of connecting design.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure at a rear of a steering column for a saddle-seat vehicle having a plurality of wheels, with at least one of the wheels being steerable, and with at least one of the wheels being drivable by a power unit, the frame structure comprising:

a main frame member having a generally circular cross-section, the main frame member being a one-piece continuous tubular member, the main frame member including a left portion, a right portion, and a curved front portion interconnecting the left portion with the right portion, and a heat plate located between the left portion and the right portion, and rearwardly of the curved front portion.

2. The frame structure according to claim 3, further comprising a steering column bracket attached to the curved front portion of the main frame member.

3. The frame structure according to claim 1, further comprising a plate bracket for fastening the heat plate to the main frame member, the plate bracket being positionable above and in engagement with the heat plate.

4. The frame structure according to claim 3, further comprising a fuel tank located above the heat plate and the plate bracket.

5. The frame structure according to claim 4, further comprising:

a central bushing located in a central region of the heat plate, right and left bushings located at right and left regions, respectively, of the heat plate, each of the right, left and central bushings having a head extending above an upper surface of the heat plate, the fuel tank resting on the heads of the bushings to thereby create an air gap between a lower wall of the fuel tank and the heat plate for cooling air to pass therethrough.

6. The frame structure according to claim 1, wherein the heat plate includes at least one lip portion which overlies one of the left portion and the right portion of the main frame member, and the lip portion engages the main frame member to hold the heat plate in position.

7. The frame structure according to claim 6, wherein the at least one lip portion includes a pair of elastic bushings which are located between the lip portion and the left and right portions of the main frame member.

8. The frame structure according to claim 7, wherein the bushings are spaced from and out of engagement with the main frame member.

9. The frame structure according to claim 8, further comprising a steering column bracket attached to the curved front portion of the main frame member.

10. The frame structure according to claim 7, further comprising a plate bracket for fastening the heat plate to the main frame member, the plate bracket being positionable above and in engagement with the heat plate.

11. The frame structure according to claim 10, further comprising a fuel tank located above the heat plate and the plate bracket.

12. The frame structure according to claim 11, further comprising:

a central bushing located in a central region of the heat plate, right and left bushings located at right and left regions, respectively, of the heat plate, each of the right, left and central bushings having a head extending above an upper surface of the heat plate, the fuel tank resting on the heads of the bushings to thereby create an air gap between a lower wall of the fuel tank and the heat plate for cooling air to pass therethrough.

13. The frame structure according to claim 6, wherein left and right lip portions are provided as the at least one lip portion, the left lip portion overlying the left portion of the main frame member and the right lip portion overlying the right portion of the main frame member.

14. The frame structure according to claim 13, wherein the left and right lip portions each include an elastic bushing which is located between the respective lip portion and the respective left and right portions of the main frame member.

15. The frame structure according to claim 14, wherein the bushings are spaced from and out of engagement with the main frame member.

16. The frame structure according to claim 15, further comprising a plate bracket for fastening the heat plate to the main frame member, the plate bracket being positionable above and in engagement with the heat plate.

17. The frame structure according to claim 16, further comprising a fuel tank located above the heat plate and the plate bracket.

18. The frame structure according to claim 17, further comprising:

a central bushing located in a central region of the heat plate, right and left bushings located at right and left regions, respectively, of the heat plate, each of the right, left and central bushings having a head extending above an upper surface of the heat plate, the fuel tank resting on the heads of the bushings to thereby create an air gap between a lower wall of the fuel tank and the heat plate for cooling air to pass therethrough.

19. The frame structure according to claim 18, further comprising a steering column bracket attached to the curved front portion of the main frame member.

20. A saddle-seat vehicle comprising:

a frame structure;

a steering column connected to the frame structure;

a plurality of wheels connected to the frame structure, with at least one of the wheels being steerable;

a power unit, with at least one of the wheels being drivable by the power unit;

the frame structure comprising a main frame member, the main frame member being a one-piece continuous tubular member, the main frame member including a left portion, a right portion, and a curved front portion interconnecting the left portion with the right portion, the curved front portion being located above and forwardly of the power unit; and a heat plate located between the left portion and the right portion, and rearwardly of the curved front portion.

* * * * *